United States Patent
Fagerstrom

(10) Patent No.: US 7,412,352 B1
(45) Date of Patent: Aug. 12, 2008

(54) COMPUTER DIAGNOSTIC SYSTEM AND METHOD

(75) Inventor: Dana C. Fagerstrom, Flemington, NJ (US)

(73) Assignee: Sun Microsystems, Inc., Menlo Park, CA (US)

( * ) Notice: Subject to any disclaimer, the term of this patent is extended or adjusted under 35 U.S.C. 154(b) by 316 days.

(21) Appl. No.: 10/986,193

(22) Filed: Nov. 12, 2004

(51) Int. Cl.
*G06F 15/00* (2006.01)

(52) U.S. Cl. ..................................... 702/186
(58) Field of Classification Search ................ 702/186
See application file for complete search history.

(56) References Cited

U.S. PATENT DOCUMENTS

2005/0081115 A1* 4/2005 Cheng et al. ................. 714/47
2006/0025962 A1* 2/2006 Ma et al. ..................... 702/182

* cited by examiner

*Primary Examiner*—Tung S Lau
(74) *Attorney, Agent, or Firm*—Finnegan, Henderson, Farabow, Garrett & Dunner, L.L.P.

(57) ABSTRACT

A method used on a computer system for determining a most likely cause of a system problem associated with the computer system. By performing the method, the computer system constructs a device tree containing information about all relevant computer devices, determines a score for each of the computer devices represented in the device tree based on predetermined criteria, and aggregates and analyzes the score for each of the computer devices to identify a most likely cause of the system problem. The device tree may be created as having hierarchy levels of tree nodes, each node representing one of all relevant computer devices and each parent node representing a computer device controlling devices represented by child nodes. The score of each of the computer device may be assigned based on whether device is busy, whether the device is idled by the external I/O connection, or whether the device is in a hung or undefined state.

14 Claims, 5 Drawing Sheets

COMPUTER DIAGNOSTIC SYSTEM AND METHOD

FIELD OF THE INVENTION

This invention generally relates to methods and systems for determining a most likely cause of computer system device failures.

BACKGROUND OF THE INVENTION

Modern computer systems are complex electronic systems made of many computer hardware devices, such as various processors, memory modules, storage devices, networking devices, etc., and sophisticated computer software programs, such as operating systems, device drivers, and application software programs. Computer system maintenance is therefore essential to keep the computer systems from abnormal conditions or failures. However, with the ever growing complexity of modern computer systems, it is sometimes difficult to determine the root cause of a system problem. Computer operating systems or other computer diagnostic programs often provide debugging methods or diagnostic tools to help identify system problems.

One of these tools is called a crash dump, which saves status information of various computer devices upon an occurrence of a system problem in a predetermined memory or storage location for diagnostic purpose. The status information is often manually reviewed by troubleshooting personnel to determine underlying causes of the system problem. Sometimes, after the troubleshooting personnel reviews the crash dump, the system problem may appear to be caused by failures of numerous input and output (I/O) devices, such as disk drives. Traditionally, the troubleshooting personnel would try to fix the system problem by replacing a first seemingly bad I/O device. If the problem persists, a second seemingly bad device is then replaced. This process would be repeated until either the problem goes away, or all the devices are replaced while the problem is still unresolved. However, this "trial and error" method generally fails to pinpoint and isolate the device problem, thus increases the computer system downtime. Moreover, this method may fail if the system problem is caused by failure of an intermediate or internal device, such as I/O controller, i.e., the seemingly failure of the I/O device is a side-effect of the failure of the internal or intermediate device.

SUMMARY OF THE INVENTION

Consistent with embodiments of the present invention, methods and devices may be provided for determining a most likely cause of a system problem associated with a computer system. In an aspect of the present invention, a method is performed by a computer system to troubleshoot the system problem. The method may include constructing at least one data structure containing information about all relevant computer devices, determining a diagnostic score for each of the computer devices in the data structure based on predetermined criteria, and aggregating the devices by analyzing the score for each of the computer devices to identify a most likely cause of the system problem.

Consistent with another aspect of the present invention, a computer system is provided for aggregating system devices to determine a most likely cause of a system problem associated with the computer system. The computer system may include one or more system boards each having at least one controller that controls a plurality of end devices, and a central processing unit programmed to perform diagnostic operations to create a device tree with at least one parent node representing the controller and a plurality of child leaf nodes representing the plurality of end devices, to determine a score for each of the child leaf nodes based on predetermined criteria, and to determine a score for the parent node as a sum of scores of each of the child leaf nodes. The central processing unit may also be programmed to compare the score of the parent node with each of the child leaf nodes' score and to decide the controller is the most likely cause of the system problem if the score of the parent node is greater than any child leaf node's score. The computer system may further include a memory to store program code executed by the central processing unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the embodiments of the invention, examples of which are illustrated in the accompanying drawings. Wherever possible, the same reference numbers will be used throughout the drawings to refer to the same or like parts.

Figure 1:
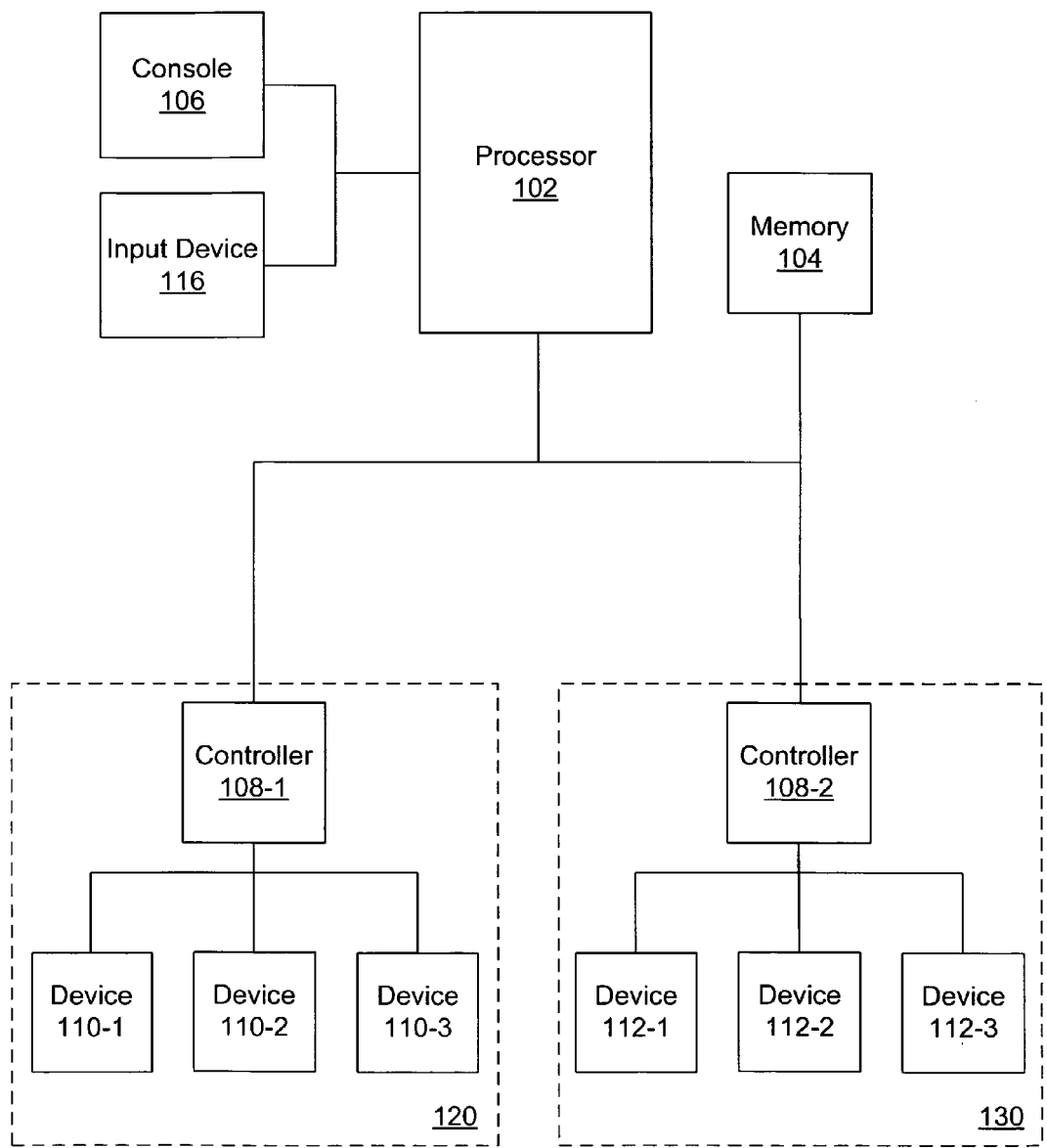
FIG. 1 illustrates a functional block diagram of an exemplary computer system incorporating embodiments of the present invention.

Computer systems often include some central processing units and many different subsystems or modules, such as I/O subsystems, disk drive modules, or network adapter modules. FIG. 1 illustrates an exemplary computer system 100 which incorporates certain embodiments of the present invention. As shown in FIG. 1, computer system 100 may include a processor 102, a memory 104, a console 106, a system board 120, a system board 130 and input devices 116. Processor 102 may be one or more general purpose microprocessors. Processor 102 may also be configured as a central processing unit for computer system 100, or, alternatively, as a combination of a central processing unit for 100 and distributed processing units from system boards 108-1 and 108-2. Further, processor 102 may execute software programs to provide a variety of functionalities. These software programs may include operating system (OS), device drivers, and application software programs.

Memory 104 may be configured to store information used by processor 102 and other devices inside computer system 100. Memory 104 may be one or more memory devices including, but not limited to, a ROM, a flash memory, a dynamic RAM, and a static RAM. During a diagnose process, memory 104 may also be used to contain a crash dump, which is a data structure generated by certain operating system (OS) software programs to collect information on all hardware devices and software components upon a system or device failure.

Console 106 may be one or more computer display devices. Input devices 116 may include any types of computer input devices, such as keyboard, mouse, or other optical and wireless input devices. Console 106 and input devices 116 provide user interfaces for a user of computer system 100 to enter commands to request computer system 100 to perform certain operations and to receive results of the operation from computer system 100. Console 106 may also display a graphical user interface (GUI) to show the received results of the operation.

System boards 120 and 130 refer to any types of subsystems incorporated into computer system 100 to provide various system functionalities. For example, system board 120 or 130 may be a small computer system interface (SCSI) module attaching devices, such as disk drives and printers. System board 120 or 130 may also be a network communication module providing networking functions to computer system 100. System board 120 may include a controller 108-1 and devices 110-1 to 110-3. Further, system board 130 may include a controller 108-2 and devices 112-1 to 112-3.

Controller 108-1 controls devices 110-1 to 110-3 and provides interfaces for processor 102 to access devices 110-1 to 110-3. Devices 110-1 to 110-3 may be separate computer devices with similar or different functionalities. For example, devices 110-1 to 110-3 may be three separate disk drives, or devices 110-1 to 110-3 may be two disk drives and one printer. Similarly, controller 108-2 also controls devices 112-1 to 112-3 and provides interfaces for processor 102 to access devices 112-1 to 112-3. Devices 112-1 to 112-3 may be different devices from devices 110-1 to 110-3. Since processor 102 has to access devices 110-1 to 110-3 and devices 112-1 to 112-3 through controllers 108-1 and 108-2, respectively, controller 108-1 and 108-2 are called intermediate devices, and devices 110-1 to 110-3 and devices 112-1 to 112-3 are called end devices. Although two system boards each having one controller associating three devices, the number of system boards, controllers, and devices are exemplary only and not intended to be limiting. Any number of system boards, controllers, and devices may be used without departing from the principle and scope of the present invention.

Computer system 100 may, from time to time, experience system problems or system failures. When a system problem or system failure occurs, computer system 100, more specifically processor 102, may perform certain actions to collect information about the system failure. Typically, processor 102 may generate a crash dump containing status information about all devices (both end devices and intermediate devices) upon the system failure. Some devices may also contribute to the crash dump by generating sections of the crash dump to record more detailed information about the devices themselves. However, since processor 102 may access end devices indirectly (i.e., through other intermediate devices), crash dump often cannot immediately indicate a root cause for the system failure, because a failure of any intermediate devices (e.g., controller 108-1) may be confused as a failure of end devices (e.g., devices 110-1 to 110-3).

In certain embodiments of the present invention, processor 102 may aggregate system devices to determine a most likely cause of system problems. The purpose of the aggregation is to quickly identify any error-prone intermediate devices since an aggregated intermediate device may represent all devices under its control. Once processor 102 creates a crash dump, processor 102 analyzes the crash dump to create a device tree. Each leaf node of the device tree may represent an end device, while each parent node of the device tree may represent an intermediate device. Thus, the device tree may represent both intermediate devices and end devices within computer system 100. Information about these devices is also obtained from crash dump and is stored in corresponding individual tree nodes. Once processor 102 creates the device tree, processor 102 may calculate a score for each leaf node based on predetermined criteria. Further, processor 102 may aggregate devices along a path of the device tree to calculate scores for intermediate nodes. By analyzing the aggregated scores of parent nodes and individual scores of leaf nodes, processor 102 may determine a most likely cause of the system problem. Details on device tree, device tree creation, device tree scoring, and device tree aggregating and analyzing are described corresponding to FIGS. 2-5, respectively.

Figure 2:
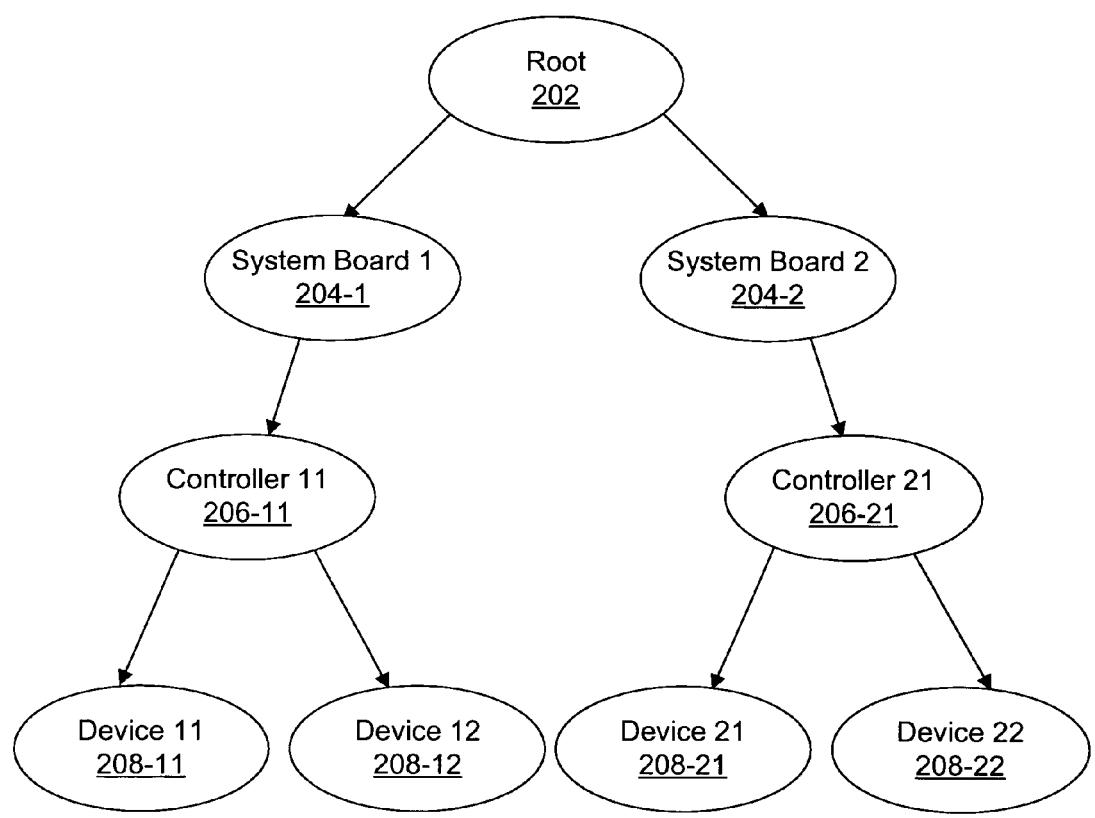
FIG. 2 illustrates an exemplary device tree consistent with the disclosed embodiments of the present invention.

FIG. 2 illustrates an exemplary device tree consistent with the disclosed embodiments of the present invention. A device tree generally comprises a hierarchy of nodes, each representing a computer device. Except a leaf node, a tree node may have one or more child nodes. A tree node in the device tree may be represented by a device path starting from a root node of the device tree. As shown in FIG. 2, a device tree 200 starts with a root node 202, which has two child nodes: a system board A 204-1 and a system board B 204-2. System board A 204-1 and system board B 204-2 also have child nodes controller A 206-1 and controller B 206-2, respectively. Controller A 206-1 and controller B 206-2, in turn, have leaf nodes device A 208-1 and device B 208-2, and device C 208-3 and device D 208-4, respectively. Device A 208-1 to device D 208-4 are leaf nodes of device tree 200. It is to be understood that the number of device tree nodes and the relationship between nodes are exemplary only and not intended to be limiting, any number of tree nodes may be present and different structural relationships may be provided without departing from the principle and scope of the present invention.

Leaf nodes of device tree 200 may represent end devices of computer system 100. For example, device A 208-1 to device D 208-4 may be disk drives, printers, network drives, and any other types of peripherals incorporated in computer system 100. Controller A 206-1 and controller B 206-2 are intermediate parent nodes on device tree 200 representing intermediate devices providing interfaces for processor 102 to access end devices presented by device A 208-1 to device D 208-4. To describe a node on device tree 200, a device path having a full path name may be provided, starting with a root node. For example, controller A may be represented as "/root/system board A/controller A," and device 208-1 may be represented as "/root/system board A/controller A/device A." A slash ("/") represents a level in a hierarchy of nodes. In the example above, root 202 is at level 1 (one slash in the device path), system board A 204-1 is at level 2 (two slashes in the device path), controller A 206-1 is at level 3 (three slashes in the device path), and device A 208-1 is at level 4 (four slashes in the device path). In the example, nodes "root" and "system board A" may be referred to as logical nodes in that they do not represent particular computer devices. Rather, "root" and "system board A" represent logical entities constructed to form the hierarchy of the device tree.

Device tree 200 may be implemented by software programs using different algorithms, such as link list, tree, or algorithms specifically provided. A node of device tree 200 may include data structures containing a name of the node, a device path name of the node, a score or weight, and information from crash dump to reflect status of the node.

Figure 3:
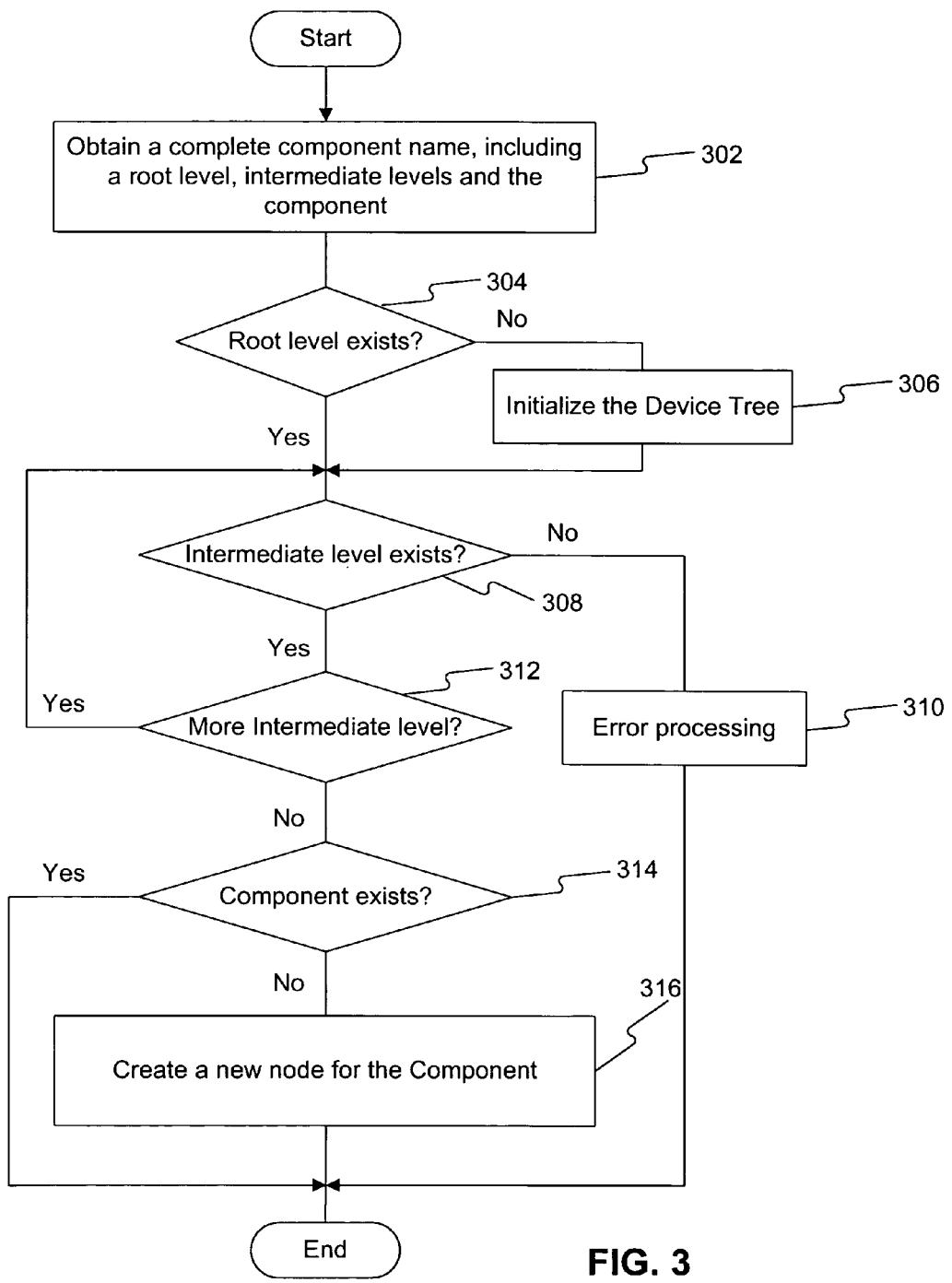
FIG. 3 illustrates a flowchart diagram of an exemplary device tree creation process.

Device tree 200 may be created by processor 102 after processor 102 creates a crash dump upon a system failure. To create a node on device tree 200, a full path name is inputted from either console 106 or automatically generated by other software programs on computer system 100. As shown in FIG. 3, at the beginning of a device tree creation process, computer system 100, more specifically processor 102, obtains a complete device path name including a root level, any intermediate levels, and/or a leaf node level (step 302). After obtaining the path name, processor 102 parses the path name to determine a root level of the path name. Processor 102 further determines whether a root node exists (step 304). If the root node does not exist (step 304; no), processor 102 initializes a device tree starting with the root node (step 306). If the root node exists, processor 102 simply gets the device tree starting with the root (step 304; yes). In either case, processor 102 creates a device tree starting with the root node.

Further, processor 102 may decide whether a device on a next level exists on the device tree starting with the root node (step 308). If the device exists (step 308; yes), the creation process proceeds to step 312. On the other hand, if the device does not exist (step 308; no), processor 102 creates a new node on the device tree, and updates the new node with a name of the node, full path name, and status information from crash dump (step 310). Afterwards, in step 312, processor 102 decides whether all levels contained in the full path name inputted are included in the device tree (step 312). If there are more levels left (step 312; yes), the creation process goes to step 308 again to continue to create new nodes corresponding to the path name until all levels are processed. If all levels are processed (step 312; no), processor 102 completes the creation process.

Figure 4:
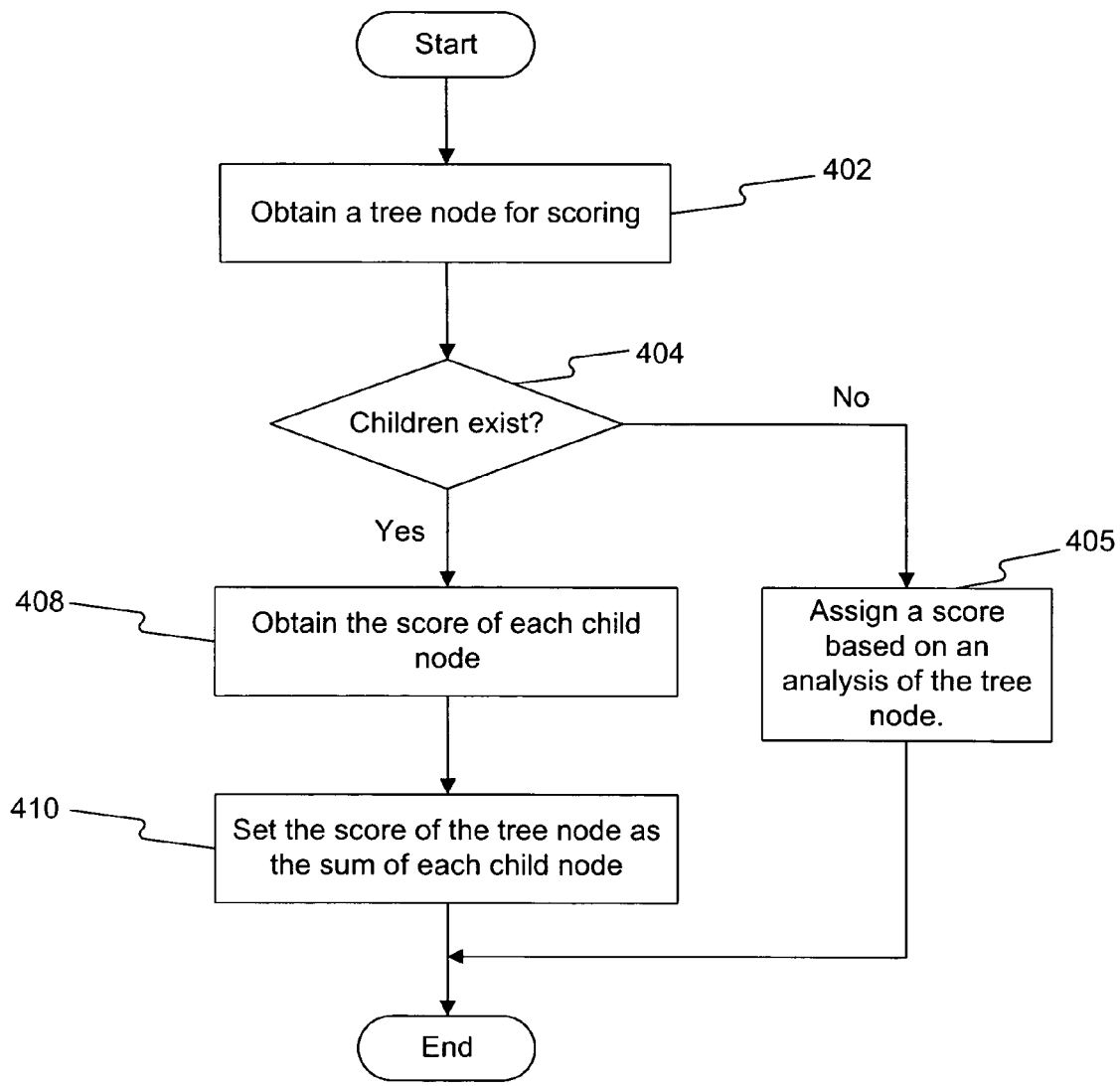
FIG. 4 illustrates a flowchart diagram of an exemplary device tree node scoring process performed by a computer system.

The device creation process may be repeated until all end devices are added to the device tree. Once a device tree with all available devices on computer system 100 is created, the device tree is traversed and a score is added to each node of the device tree. Those skilled in the art will recognize that other tree creation algorithms may be used to create a tree that accommodates the present invention. FIG. 4 illustrates a flowchart diagram of an exemplary device node scoring process performed by processor 102.

When traversing a device tree, processor 102 obtains a tree node (step 402). Once obtaining information about the tree node, processor 102 determines whether the tree node has a child node (step 404). If the tree node does not have a child node (step 404; no), processor 102 may determine that the tree node is a leaf node (i.e., an end device) and set a score to the tree node based on status information contained in the tree node using predetermined algorithms (step 405). The algorithms may be based on whether the device is busy, or is idled by external I/O connections, or whether the device is in a hung or undefined state. Once processor 102 scores the tree node, processor 102 completes the scoring process for the tree node. However, if in step 404, processor 102 determines that the tree node has one or more child nodes (step 404; yes), processor 102 may further obtain a score for each of the one or more child nodes (step 408). Processor 102 then adds all the scores of the child nodes together and sets a score of the tree node (step 410). Afterwards, the scoring process exits. By repeating the creation process, all tree nodes of the device tree may be scored.

Figure 5:
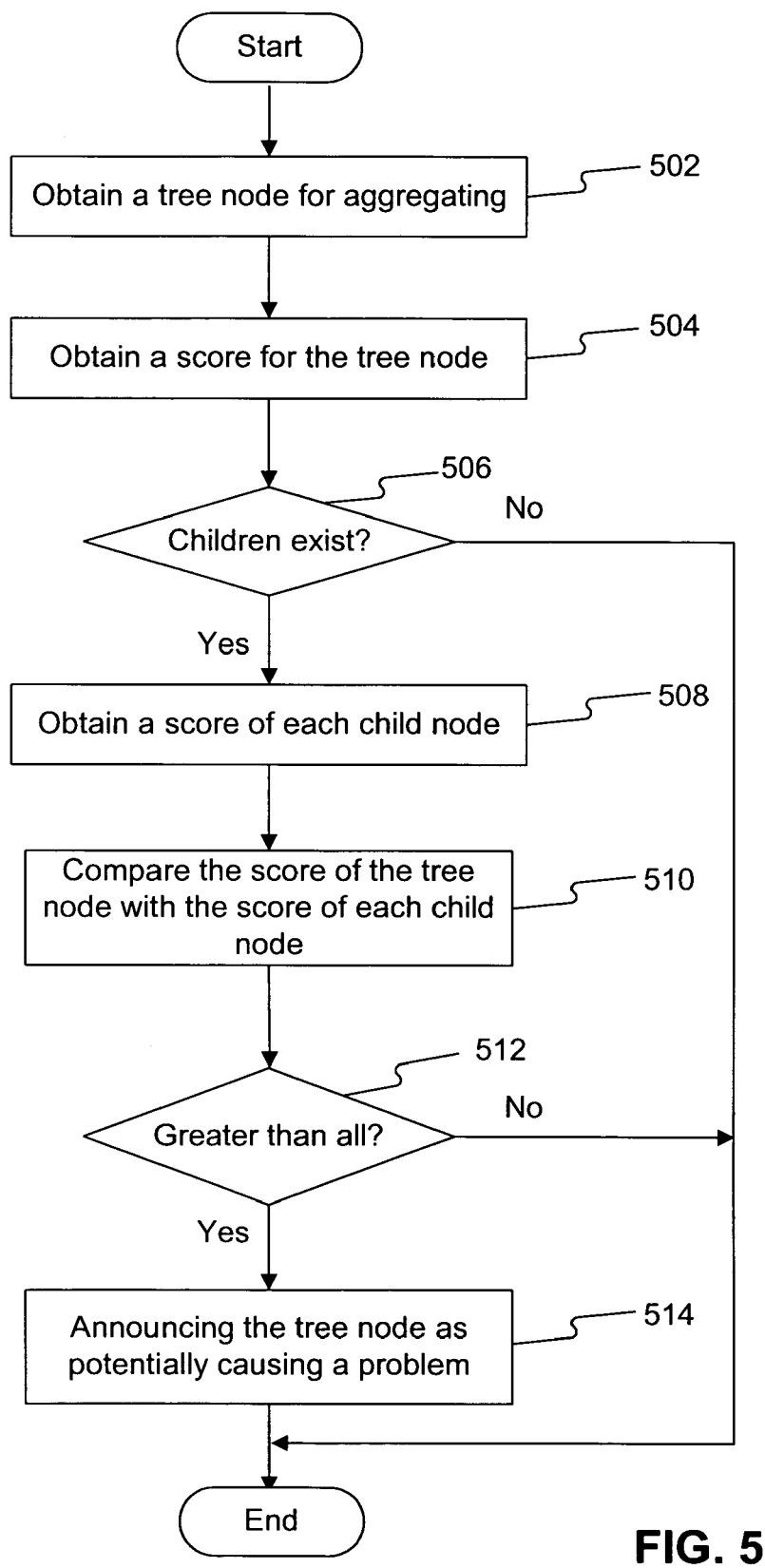
FIG. 5 illustrates a flowchart diagram of an exemplary device tree node aggregating process performed by a computer system.

Once a device tree is scored, aggregation and analyzing process may then be performed. Generally, logical nodes are not included in the aggregation and analyzing process. FIG. 5 illustrates a flowchart diagram of an exemplary device aggregating and analyzing process performed by computer system 100, more specifically processor 102. As shown in FIG. 5, processor 102 first traverses the device tree to obtain a tree node for aggregating (step 502). Processor 102 also obtains the tree node's score (step 504). After reading out the tree node's score, processor 102 determines if the tree node has any child nodes (step 506). If the tree node does not have any child nodes (step 506; no), the aggregating and analyzing process for this tree node exits. On the other hand, if the tree node has one or more child nodes (step 506; yes), the aggregating and analyzing process continues.

Continuing the aggregating and analyzing process, processor 102 obtains each of the one or more child nodes' score (step 508). Processor 102 then compares the score of the tree node to the score of each of the one or more child nodes (step 510). If the score of the tree node is greater than the score of each of its child nodes (step 512; yes), processor 102 may decide that the tree node is an error prone device potentially causing the system problem (step 514). If the score of the tree node is not greater than the score of any child node (step 512; no), the aggregating and analyzing process for the tree node exits. By repeating this process, processor 102 may determine error prone devices at each level of the device tree. The cause of the system problem therefore can be isolated and pinpointed. For example, the cause of seemingly defective disk drives (e.g., devices 110-1 to 110-3) may be a controller (e.g., controller 108-1), and not the disk drives themselves.

However, if none of parent nodes has a score greater than any of its child nodes, intermediate devices are not likely a cause of the system problem. Under this situation, end devices with highest score may be the most likely cause of the system problem. Those skilled in the art will recognize that other algorithms may be employed to traverse a tree of this type, assign scores, and aggregate scores for the many combinations of nodes that can be formed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for troubleshooting a system problem of a computer system, comprising:

constructing at least one data structure containing information about all relevant computer devices organized according to a hierarchy;

determining a score for each of the computer devices in the data structure based on predetermined criteria;

aggregating the score of each of the computer devices to include scores of any associated computer devices lower in the hierarchy; and analyzing the score for each of the computer devices to identify a most likely cause of the system problem.

2. The method according to claim 1, wherein the data structure is a tree structure and each node in the tree structure capable of representing a computer device.

3. The method according to claim 1, wherein the predetermined criteria include at least:

device being busy;

device being idled by the external I/O connection; and device being in a hung or undefined state.

4. The method according to claim 2, prior to the step of constructing, further comprising:

creating a crash dump to provide the information about all relevant computer devices.

5. The method according to claim 2, wherein scoring further comprises:
   assigning a score for each leaf node of the tree structure based on the predetermined criteria; and
   assigning a score for each non-leaf node of the tree structure as a sum of scores of child nodes of the each non-leaf node.

6. The method according to claim 4, wherein constructing further comprises:
   traversing the crash dump to identify all relevant computer devices;
   collecting status information about the devices; and
   creating the tree structure having hierarchy levels of tree nodes, each node representing one of all relevant computer devices and each parent node representing a computer device controlling devices represented by child nodes,
   wherein the collected status information is recorded in corresponding tree nodes.

7. The method according to claim 5, wherein analyzing further comprises:
   comparing the score of each non-leaf node with scores of child nodes of the each non-leaf node;
   determining a non-leaf node with a score greater than each child node's score; and
   announcing the non-leaf node as a most likely cause of the system problem.

8. The method according to claim 6, wherein creating the tree structure further comprises:
   representing each node with a full path name including both logical nodes and device nodes, each node separated by a slash ("/") representing a level of the tree structure hierarchy.

9. A computer-readable medium for use on a computer system, for aggregating system device information to determine a most likely cause of a system problem in the computer system, having computer-executable instructions for performing a method comprising:
   constructing at least one device tree containing information about all computer devices organized according to a hierarchy and listed in a previously created crash dump;
   determining a score for each of the computer devices in the device tree based on predetermined criteria;
   aggregating the score of each of the computer devices to include scores of any associated computer devices lower in the hierarchy; and
   identifying the most likely cause of the system problem based upon the aggregated score.

10. The computer-readable medium according to claim 9, wherein constructing further comprises:
    collecting the information from the previously created crash dump; and
    creating the device tree having hierarchy levels of tree nodes such that each node represents one of the computer devices and each parent node represents an intermediate computer device controlling computer devices represented by child nodes;
    wherein the collected information is recorded in corresponding tree nodes.

11. The computer-readable medium according to claim 9, wherein the predetermined criteria include at least:
    device being busy;
    device being idled by the external I/O connection; and
    device being in a hung or undefined state.

12. The computer-readable medium according to claim 9, wherein determining further comprises:
    assigning a score for each leaf node of the device tree based on the predetermined criteria; and
    assigning a score for each non-leaf node of the device tree as a sum of scores of child nodes of the each non-leaf node.

13. The computer-readable medium according to claim 12, wherein identifying further comprises:
    comparing the score of each non-leaf node with scores of child nodes of the each non-leaf node;
    determining a non-leaf node with a score greater than each child node's score; and
    announcing the non-leaf node as a most likely cause of the system problem.

14. The computer-readable medium according to claim 13, wherein identifying further comprises:
    announcing a leaf node with the highest score as the most likely cause of the system problem if the score of the non-leaf node is not greater than each of child leaf node's score.

* * * * *